Figure 1:
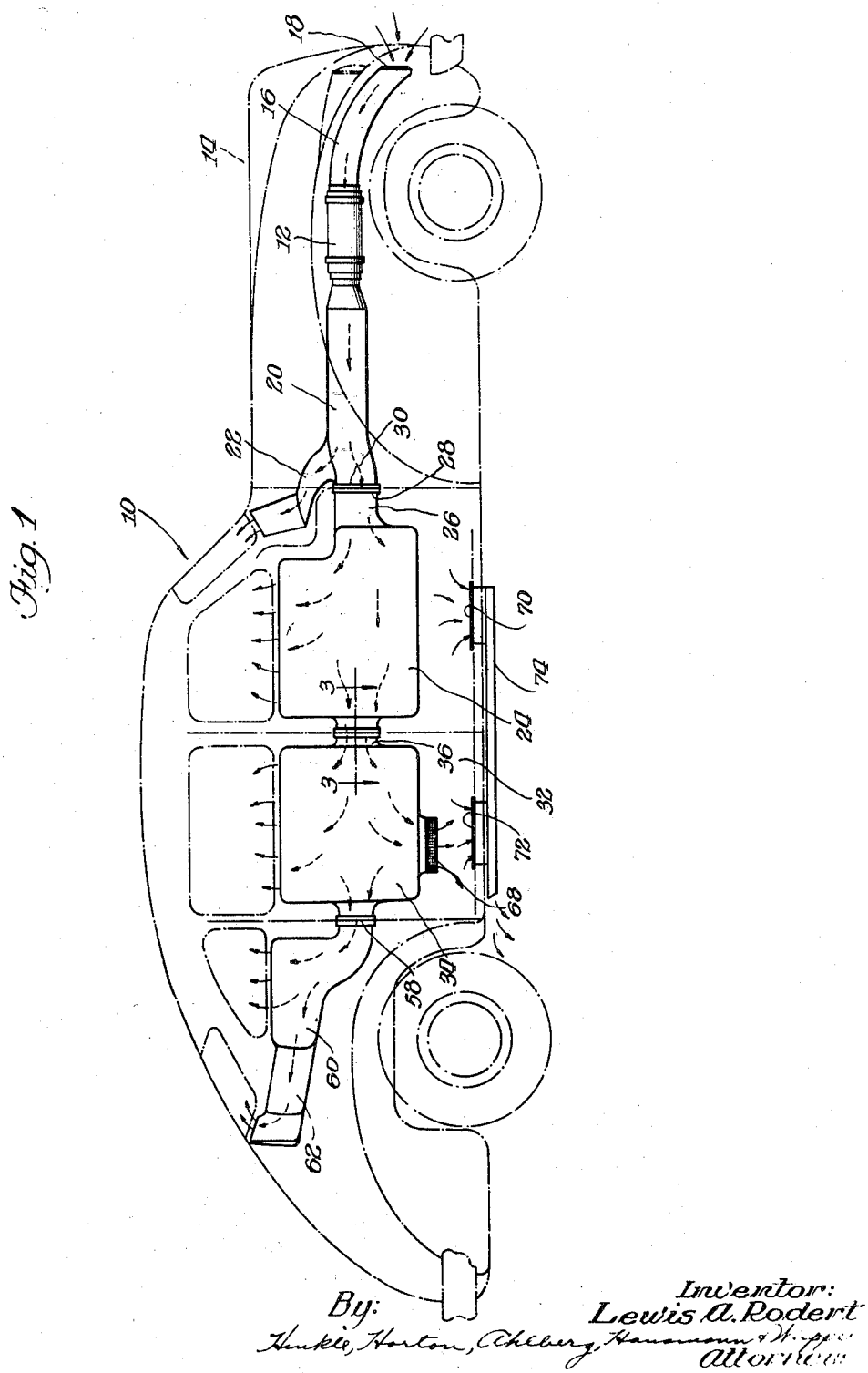

Sept. 26, 1950      L. A. RODERT      2,523,923
AUTOMOBILE HEATING SYSTEM

Filed June 22, 1946      2 Sheets-Sheet 1

Inventor:
Lewis A. Rodert

Sept. 26, 1950  L. A. RODERT  2,523,923
AUTOMOBILE HEATING SYSTEM

Filed June 22, 1946  2 Sheets-Sheet 2

Inventor:
Lewis A. Rodert
By:
Hinkle, Horton, Ahlberg, Hammann & Nipper
Attorneys Patented Sept. 26, 1950

2,523,923

UNITED STATES PATENT OFFICE 2,523,923

AUTOMOBILE HEATING SYSTEM

Lewis A. Rodert, Indianapolis, Ind., assignor to Stewart-Warner Corporation, Chicago, Ill., a corporation of Virginia Application June 22, 1946, Serial No. 678,691

6 Claims. (Cl. 98—2)

The present invention relates to automobile heating systems and is more particularly concerned with the provision of a combination hot air and hot panel system particularly adapted for use in heating automobiles.

It is one of the objects of the present invention to provide a novel heating system for an automobile which provides hot air outlets adjacent the inside surfaces of the glass areas in the vehicle for the purpose of keeping the glass free from fog while at the same time providing hot panels on both sides of the occupants of the vehicle.

Yet another object is to provide an improved heating system of the above type in which the hot panels are formed within the doors and side walls of the vehicle.

Yet another object of the present invention is to provide a novel heating system for an automobile which takes in fresh air from an outside point, raises the temperature of the air to a desirable level and then uses this air for heating the inside surfaces of the automobile doors and other side walls of the vehicle, the air after its temperature has been reduced somewhat by heating the panels being exhausted within the vehicle in such locations that this warm air provides good ventilation, good defogging action on the glass surfaces, and local spot heating where desired.

Still another object of the present invention is to provide all of the above at low cost.

Other objects and advantages will become apparent from the following description of a preferred embodiment of my invention which is illustrated in the accompanying drawings.

Figure 2:
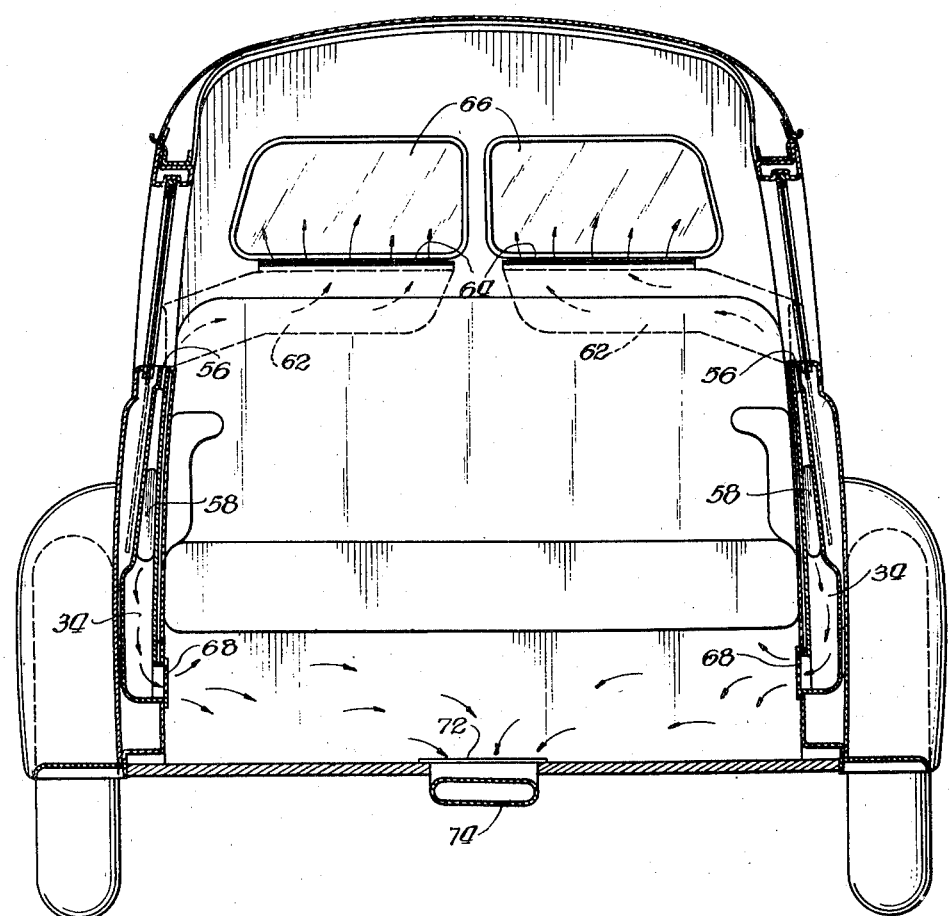
Figure 3:
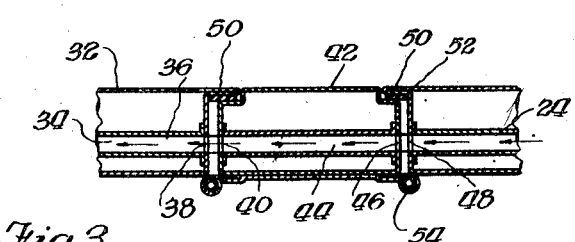

In the drawings, in which similar characters of reference refer to similar parts throughout the several views:

Fig. 1 is a phantom view of a typical automobile having four doors with the heating system of the present invention shown therein in full lines;

Fig. 2 is a vertical transverse sectional view of the heating system and may be considered as taken substantially through the center of the rear door of the automobile; and Fig. 3 is a horizontal sectional view of a portion of the duct system included as a part of the present heating system and may be considered as taken substantially along the line 3—3 of Fig. 1 looking downwardly as indicated by the arrows.

The automobile illustrated in Figs. 1 and 2 may be considered as substantially conventional in construction and for purpose of reference is indicated generally by the numeral 10. The heating system includes a hot air heater 12 located in the space beneath the automobile hood 14 and connected on the ventilating air inlet side to a duct 16 which leads to a fresh air intake point which conveniently may be located behind the radiator grill, as at 18. The heater per se may be of the type illustrated and described in the copending application of George W. Allen and Vernon N. Tramontini for Heater, filed June 14, 1946, and which has been assigned Serial No. 676,776, now Patent No. 2,507,081. Another suitable heater is illustrated and described in the application of William A. Marshall, Jr., Serial No. 615,040, filed September 7, 1945, for "Heating Apparatus," now Patent No. 2,507,113.

In a heater of this type the automobile fuel, usually gasoline, is burned within a combustion chamber and the hot products of combustion thus formed pass in heat exchange relation to the ventilating air stream flowing through the duct 16. The temperature of the ventilating air is therefore raised to a desired level and the cooled products of combustion are exhausted to the atmosphere. Inasmuch as the present invention relates to the heating system rather than the heater per se, the above general description and reference to copending applications is sufficient for disclosure of the heater.

The hot ventilating air passes rearwardly from the heater 12 into a duct 20 which branches at the automobile dash so as to provide a small hot air stream which flows upwardly through a defrosting duct 22 to a slot along the lower edge of the windshield. At approximately this same point in the duct system the remaining portion of the hot air is divided into two streams which pass along the opposite side of the automobile body.

The front door of the automobile has a vertically arranged thin chamber 24 which may be formed of sheet metal or other suitable material and which is disposed within the portion of the door below the glass area and adjacent the inside door surface. In other words, it should be sufficiently thin and sufficiently close to the inside door surface so that the glass when lowered will pass into a position approximately parallel to the chamber 24 and in a location between the chamber and the outside door surface. If desired, the inner wall of the chamber 24 may form the inside surface of the door, excepting that for reason of appearance it will usually be preferable to cover this surface with upholstery fabric or the equivalent.

The chamber 24 will preferably be large enough to cover the major portion of the door area immediately below the window and should extend downwardly to a point approximately even with the top of the seat cushion. It may, if desired, extend downwardly beyond this point but less benefit is obtained from any portion of the heating chamber or panel which is located below the seat level, since a greater portion of the heat will be radiated into the seat and thus the heat is less efficiently utilized.

The chamber 24 at the edge toward the front of the door has a short duct 26 extending to a slot 28 in substantial alignment with another slot 30 formed in the adjoining edge of the automobile body, the slot 30 being connected to the duct 20. If the slots 28 and 30 are on the hinged side of the door, one of the faces of the door or body portion outlining the slots may be faced with a rubber or similar composition compression gasket, so that when the door is closed a tight seal is formed between the door and the body around the two slots 28 and 30, thus forming an air-tight continuation of the duct 20 on into the door by way of the duct 26. If the slot 28 is formed in the edge of the door opposite the hinges, then it is probably preferable not to attempt any direct seal, but to depend upon the rubber gaskets which seal the periphery of the door at its outer surface to prevent hot air from escaping to the outside. Such construction will be described in greater detail presently in connection with the body center post.

The rear door 32 of the automobile is similarly provided with a heating panel 34 formed as a compartment which lies beneath the upholstery material adjacent the inside surface of the door. The compartment 34 has an inlet duct 36 leading to a slot 38 in the forward edge of the rear door in alignment with a slot 40 in the center post 42 of the automobile. A short duct 44 also extends through the center post and at the forward edge thereof has a slot 46 in communication with a similar slot 48 formed at the rearward edge of the front door. The slot 48 in turn communicates with the hollow panel or chamber in the front door.

When both the front and rear doors are closed, the slots 48 and 46 are in alignment, thereby permitting hot air to flow from the chamber 24 into the duct 44 which extends from front to back through the center post 42. Similarly, slots 40 and 38 being in alignment permit the hot air to flow from the duct 44 in the center post into the chamber 34 in the rear door.

An automobile door normally is provided with a peripheral flange 50 which carries a rubber compression gasket 52 on its inner surface, this gasket being brought against a sealing surface on the outer face of the center post 42 and other adjacent portion of the automobile body. There will be little loss of hot air, therefore, to the outside due to leakage around the edges of the doors. Any air which leaks into the body of the automobile will serve a useful purpose in helping to heat the vehicle and to provide ventilation, but in general the amount of air thus escaping into the interior will be small because of the conventionally used sponge rubber or similar material bead 54 which is used in most automotive vehicles to serve as an inside seal around the door edge and which further serves as a portion of the interior trim.

If desired, the upper edges of the chambers 24 and 34 may form narrow slots which permit a portion of the hot air to escape upwardly in a position closely adjacent to the inside surface of the glass so as to aid in defogging the side windows of the vehicle. Such a slot is indicated at 56 in Fig. 2.

At the rearward edge of the rear door, the chamber 34 is connected by way of a pair of aligned slots of the type previously described, the slots being indicated at 58, with a hollow panel 60 disposed at the sides of the vehicle beneath the upholstery material in the portion of the body rearwardly of the rear door. The chamber 60 may also be connected to ducts 62 which lead inwardly and upwardly to slots 64 which discharge a portion of the hot air upwardly against the rear windows 66.

The major portion of the available heat in the hot air flowing from the heater 12 will be given up in the panels 24, 34 and 60 and in defogging the windshield and windows. Inasmuch as the panels are heated above body temperature, they prevent the radiation of heat outwardly from the occupants and therefore contribute to the occupants' comfort, particularly since the heat flow from the occupants by radiation outwardly would otherwise be considerable. This is especially so because of the considerable amount of glass area which cannot economically be insulated. In other words, the hot panels tend to balance the radiant heat loss of the occupants through the glass area.

If desired, a portion of the hot air, such as that within the panel 34, may be discharged inwardly of the vehicle by way of a small low-level outlet 68 so as to provide a quantity of warm air around the feet and legs of the occupants of the rear seat, this particular portion of an automotive vehicle ordinarily being somewhat difficult to maintain at a desirable temperature level by ordinary heating means.

The hot air which finds its way into the vehicle by way of the several outlets in the duct system is discharged at floor level by way of a pair of grills 70 and 72 located in the floor of the front and rear compartments of the vehicle, these grills leading to a duct 74 which discharges to the outside beneath the vehicle floor. If preferred, an air scavenging system of the type shown in my copending application for "Ventilating System," Serial No. 661,087, may be used.

It will be seen that a heating system of the type described and forming the subject matter of the present invention provides heated panels in the side walls of the vehicle including the interior surfaces of the vehicle doors and also provides for the distribution of warm air on the inside surfaces of all of the glass area along with additional hot air outlets wherever desired.

It will be appreciated, however, that the intention is to use the major portion of the heat available to the present system in keeping the inside walls of the vehicle at a temperature sufficient to obtain the advantage of a warm panel type heating system.

Having described my invention, what I claim as new and useful and desire to secure by Letters Patent of the United States is:

1. In a vehicle having a body with a door jamb therein, a door fitted to said jamb and a window in said door, a hot air heater having a ventilating air outlet connection, duct means connected to the outlet connection of said heater and leading to said door jamb, means forming a thin chamber substantially coextensive with the major portion of the inside surface of said door below the lower edge of said window and terminating at its lower edge at approximately the level of the top of the adjacent seat cushion, said door jamb having an opening therethrough connected to said duct means, said door having an opening therein in alignment with the last said opening, the opening in said door being connected to the chamber in said door, means forming an opening for the escape of hot air from said chamber to the interior of said body, and blower means arranged to cause circulation of air from said heater to the chamber in said door and from the chamber in said door to the interior of said body.

2. In a vehicle having a body with a door jamb therein, a door fitted to said jamb and a window in said door, a hot air heater having a ventilating air outlet connection, duct means connected to the outlet connection of said heater and leading to said door jamb, means forming a thin chamber substantially coextensive with the major portion of the inside surface of said door below the lower edge of said window and terminating at its lower edge at approximately the level of the top of the adjacent seat cushion, said door jamb having an opening therethrough connected to said duct means, said door having an opening therein in alignment with the last said opening, the opening in said door being connected to the chamber in said door, means forming an opening for the escape of hot air from said chamber to the interior of said body, a sealing gasket extending around the major portion of the periphery of said door adjacent the outside thereof and adapted to engage the contiguous portion of the door frame to prevent hot air in the space between said door and said jamb from leaking outwardly when said door is closed, and blower means arranged to cause circulation of air from said heater to the chamber in said door and from the chamber in said door to the interior of said body.

3. In a vehicle having a body with a door jamb therein, a door fitted to said jamb and a window in said door, a hot air heater having a ventilating air outlet connection, duct means connected to the outlet connection of said heater and leading to said door jamb, means forming a thin chamber substantially coextensive with the major portion of the inside surface of said door below the lower edge of said window and terminating at its lower edge at approximately the level of the top of the adjacent seat cushion, said door jamb having an opening therethrough connected to said duct means, said door having an opening therein in alignment with the last said opening, the opening in said door being connected to the chamber in said door, means forming an opening for the escape of hot air from said chamber to the interior of said body, and blower means arranged to draw in air from a location outside said body and to pass said air to the heater inlet connection.

4. The combination called for in claim 1 in which the opening for the escape of air includes means for directing a blast of the said air against the inside surface of the door window.

5. The combination called for in claim 1 in which the opening for the escape of air includes a second thin chamber coextensive with a portion of the interior surface of the wall of said vehicle, said second chamber being vented to the interior of said body and receiving air from the first said chamber.

6. The combination called for in claim 1 in which the door has opposed panels forming a hollow chamber and the means forming a thin chamber comprises opposed walls within the hollow chamber.

LEWIS A. RODERT.

REFERENCES CITED

The following references are of record in the file of this patent:

UNITED STATES PATENTS

| Number | Name | Date |
| --- | --- | --- |
| 2,133,488 | Stearns | Oct. 18, 1938 |
| 2,304,643 | Hans | Dec. 8, 1942 |
| 2,391,408 | Galamb et al. | Dec. 25, 1945 |